United States Patent
Tseng et al.

(10) Patent No.: US 6,688,883 B2
(45) Date of Patent: Feb. 10, 2004

(54) APPARATUS FOR OXYGEN ENRICHMENT OF CEMENT KILN SYSTEM

(75) Inventors: Herman H. Tseng, Houston, TX (US); Philip A. Alsop, Houston, TX (US)

(73) Assignee: Cemex, Inc., Houston, TX (US)

( * ) Notice: Subject to any disclaimer, the term of this patent is extended or adjusted under 35 U.S.C. 154(b) by 0 days.

(21) Appl. No.: 10/194,749

(22) Filed: Jul. 12, 2002

(65) Prior Publication Data
US 2002/0172907 A1 Nov. 21, 2002

Related U.S. Application Data

(62) Division of application No. 09/485,012, filed as application No. PCT/US97/13231 on Jul. 30, 1997.

(30) Foreign Application Priority Data
Jul. 30, 1997 (CA) ................................ PCT/US97/13231

(51) Int. Cl.[7] .............................. F27B 7/36; C04B 2/10
(52) U.S. Cl. ........................... 432/105; 432/14; 432/58; 106/739
(58) Field of Search ............................ 432/14, 15, 58, 432/79, 85, 105, 106; 106/739

(56) References Cited

U.S. PATENT DOCUMENTS

| | | |
|---|---|---|
| 1,842,609 A | 1/1932 | Hillhouse |
| 3,276,755 A | 10/1966 | Bast ............... 263/32 |
| 3,397,256 A | 8/1968 | Paul et al. ............ 263/52 |
| 3,469,828 A | 9/1969 | Lane ............... 263/32 |
| 3,712,600 A * | 1/1973 | Landthaler ............ 432/80 |
| 3,925,091 A | 12/1975 | Yoshida et al. ......... 106/100 |
| 3,955,995 A | 5/1976 | Touborg .............. 106/100 |
| 4,014,641 A | 3/1977 | Shigeyoshi ............ 432/58 |
| 4,035,193 A | 7/1977 | Miyamoto ............. 106/100 |
| 4,062,691 A | 12/1977 | Brachthäuser et al. ...... 106/100 |

(List continued on next page.)

FOREIGN PATENT DOCUMENTS

| | | | |
|---|---|---|---|
| DE | 145537 | 12/1902 | |
| DE | 1 153 312 | 8/1963 | |
| DE | 135615 | 5/1979 | ............ 135/15 |
| DE | 3 522 883 | 1/1987 | ............ C04B/7/43 |
| EP | 1 037 005 A2 | 9/2000 | |
| FR | 1529964 | 5/1967 | |
| FR | 2280601 | 2/1976 | ............ C04B/7/36 |
| GB | 1150329 | 4/1969 | ............ F27B/7/36 |
| GB | 1 523 621 | 9/1978 | ............ C04B/7/351 |
| WO | WO83/03601 | 10/1983 | ............ C04B/7/44 |

(List continued on next page.)

OTHER PUBLICATIONS

T. Fujisawa; "New Cement Burning Technology"; *ZKG International*, vol. 42, No. 10, Oct. 1, 1989, pp. 303–305 (English translation attached).

"Intensification of clinkering in a rotary kiln, using oxygen enriched air," Lur'e, et al., *Tsement*(1947), 13 (No. 1; No. 2) 3–9, 3–8. (Abstract Only).

(List continued on next page.)

*Primary Examiner*—Gregory Wilson
(74) *Attorney, Agent, or Firm*—Ira D. Finkelstein; Howrey Simon Arnold & White, LLP

(57) ABSTRACT

The invention in its various embodiments includes an apparatus and a method for improving combustion in a cement kiln system. The apparatus in one embodiment includes a precalciner and an oxygen source coupled to the precalciner. The method in one embodiment includes introducing oxygen into the precalciner of a cement kiln system.

39 Claims, 3 Drawing Sheets

U.S. PATENT DOCUMENTS

| | | | | |
|---|---|---|---|---|
| 4,187,071 A | | 2/1980 | Brachthäuser et al. | 432/106 |
| 4,197,137 A | | 4/1980 | Abe et al. | 106/100 |
| 4,248,639 A | * | 2/1981 | Quittkat | 106/759 |
| 4,249,892 A | | 2/1981 | Brachthäuser et al. | 432/14 |
| 4,260,369 A | | 4/1981 | Warshawsky | 432/3 |
| 4,265,670 A | | 5/1981 | Brachthäuser et al. | 106/100 |
| 4,280,418 A | | 7/1981 | Erhard | 110/347 |
| 4,289,483 A | | 9/1981 | Deussner | 432/106 |
| 4,295,823 A | | 10/1981 | Ogawa et al. | 432/106 |
| 4,298,393 A | | 11/1981 | Brachthäuser et al. | 106/100 |
| 4,353,750 A | * | 10/1982 | Quittkat | 106/744 |
| 4,354,829 A | | 10/1982 | Estes | 432/117 |
| 4,363,668 A | | 12/1982 | Herchenbach | 106/100 |
| 4,367,065 A | | 1/1983 | Cnare | 432/14 |
| 4,369,067 A | | 1/1983 | Enkegaard | 106/100 |
| 4,402,667 A | | 9/1983 | Goldmann | 432/14 |
| 4,416,696 A | | 11/1983 | Zagar et al. | 106/100 |
| 4,416,697 A | | 11/1983 | Zagar et al. | 106/100 |
| 4,457,705 A | | 7/1984 | Ramesohl et al. | 432/106 |
| 4,560,412 A | | 12/1985 | Weber | 106/101 |
| 4,708,644 A | | 11/1987 | Lawall et al. | 432/106 |
| 4,741,694 A | | 5/1988 | Mason et al. | 432/14 |
| 4,747,879 A | | 5/1988 | Wolter et al. | 106/100 |
| 4,774,064 A | | 9/1988 | Arnold et al. | 423/168 |
| 4,913,742 A | | 4/1990 | Kwech | 106/100 |
| 4,922,841 A | | 5/1990 | Kent | 110/346 |
| 4,934,931 A | | 6/1990 | Angelo, II | 432/105 |
| 5,007,823 A | | 4/1991 | Mayotte et al. | 432/14 |
| 5,122,189 A | | 6/1992 | Garrett et al. | 106/745 |
| 5,454,714 A | | 10/1995 | Paliard | 432/14 |
| 5,572,938 A | * | 11/1996 | Leger | 110/346 |
| 5,580,237 A | | 12/1996 | Leger | 431/8 |
| 5,614,016 A | | 3/1997 | Hundelbøl | 106/745 |
| 5,882,190 A | | 3/1999 | Doumet | 432/106 |
| 5,927,967 A | | 7/1999 | Bauer | 432/72 |
| 6,077,072 A | * | 6/2000 | Marin et al. | 432/105 |
| 6,113,389 A | | 9/2000 | Joshi et al. | 432/180 |
| 6,241,514 B1 | * | 6/2001 | Joshi et al. | 432/105 |
| 6,264,466 B1 | | 7/2001 | Joshi et al. | 432/181 |
| 6,276,928 B1 | * | 8/2001 | Joshi et al. | 432/26 |
| 6,309,210 B1 | | 10/2001 | Marin et al. | 432/14 |
| 6,468,075 B2 | * | 10/2002 | Streit et al. | 432/106 |
| 6,626,662 B2 | * | 9/2003 | Ramesohl et al. | 432/58 |

OTHER PUBLICATIONS

"Theoretical study of the use of excess oxygen combustion in a cement rotary kiln," Li, et al. *Wuhan Gongye Daxue Xuebao*(1997), 19(4), p. 47–49. (1997), (Abstract Only).

"Combustion, Fuels, Stoichiometry, Heat Transfer, Fluid Flow," Reed, R.J., *North American Combustion Handbook*(1986), vol. I, p. 76–79 (1986).

"Oxygen enrichment of primary air can improve kiln production," La Velle, M.J., *Rock Products*(1959), pp. 97, 100–101. (1959).

"Oxygen Enrichment of Combustion Air In Rotary Kilns," Gaydos, R.A., *Journal of the PCA Research and Development Laboratories*, vol. 7 (No. 3) pp. 49–56, Union Carbide Corp., p. 1–7. (09/72).

*The Rotary Cement Kiln*, Peray, K.E., 2d ed. (1986), p. 74–75. (1986).

*Riegel's Handbook of Industrial Chemistry*, Kent, J.A., $7^{th}$ ed. (1974), p. 516–523 (1974).

"The Effect of Oxygen Upon the Rotary Kiln's Production and Fuel Efficiency: Theory and Practice," Wrampe et al; *IEEE Trans. on Industry Applications*, vol. IA–12, No. 6, Nov./Dec. 1976, p. 568–573.

"Theory and Practice with Oxygen Enrichment in a Cement Kiln Firing Waste Derived Fuels," Hansen, et al., Ash Grove Cement Co. and Praxair Technology Inc. (1994) p. 1–12 (1994).

"Mathematical Modelling of a Rotary Lime Kiln and the Use of Innovative Oxygen Injection Technology to Improve Thermal Performance," Gredley et al., p. 1–37 (Paper—Date Unknown).

* cited by examiner

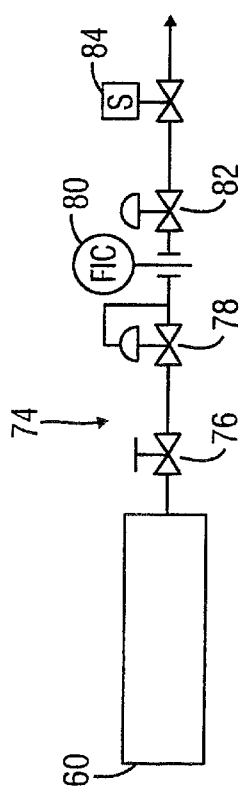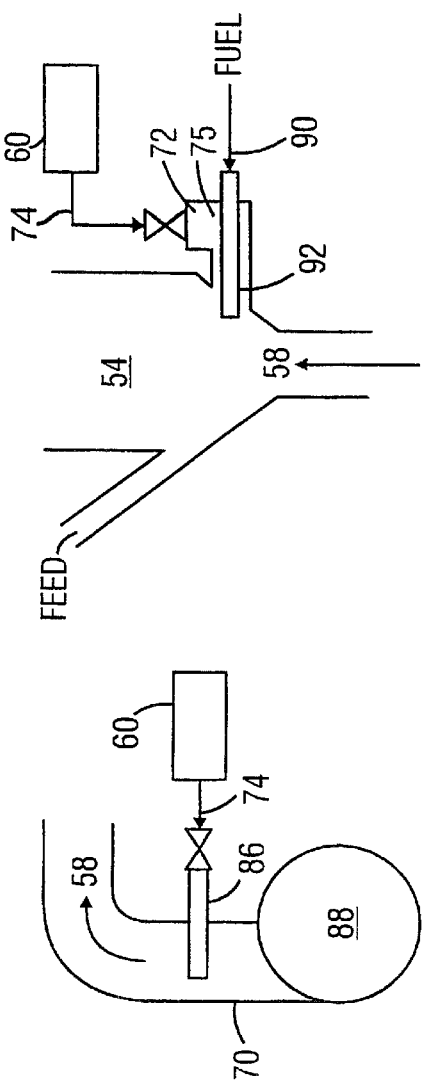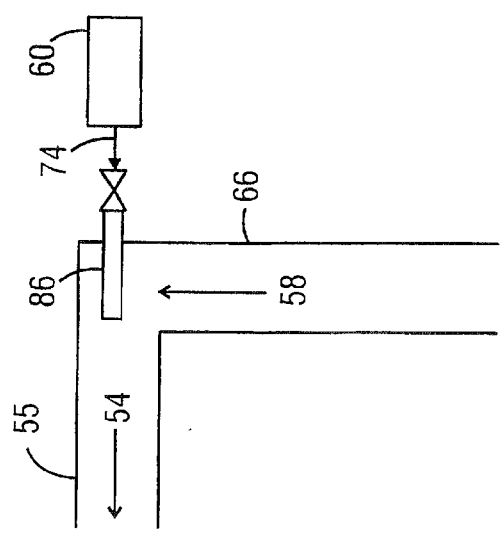

US 6,688,883 B2

APPARATUS FOR OXYGEN ENRICHMENT OF CEMENT KILN SYSTEM

This is a division of U.S. application Ser. No. 09/485,012, filed Apr. 10, 2000, which is the U.S. national stage of International Application No. PCT/US97/13231 filed Jul. 30, 1997.

BACKGROUND OF THE INVENTION

1. Field of the Invention

This invention generally pertains to the field of Portland cement manufacturing and more particularly, to the combustion process in Portland cement manufacturing.

2. Description of Related Art

The Portland cement manufacturing process has, in its most general form, long been established. As shown in FIG. 1, a raw feed material 12 is fed into a cement kiln system 10 wherein it is heated until it calcines and transforms into a material 13 known as "cement clinker" or "clinker". More particularly, the raw feed material 12 is fed into the cyclone preheater 14. The preheater 14 heats the raw feed 12 to a temperature ready for calcination and then passes the preheated feed 12 to the precalciner 16. The precalcined feed 12 then enters the rotary kiln 18 wherein it is transformed into the clinker 13 that is deposited in clinker cooler 20.

The calcination reaction in the precalciner 16 takes place at a relatively narrow temperature range of about 1500 to 1600° F. The heat for calcination is provided by the flameless combustion of fuel injected at point 17 of the precalciner 16 and the preheated feed 12 can reach over 90% calcination before entering the rotary kiln 18. The residual carbonate is calcined in the rotary kiln 18, where the temperature of the calcined feed 12 is raised to a clinkering temperature of about 2650° F. by firing a mixture of fuel and air by kiln burner 22. At the clinkering temperature, approximately 25% of the hot meal is liquefied and, to reach the clinkering temperature, a flame temperature of over 3500° F. is required.

The tumbling action of the rotary kiln forms the partially liquefied feed into clinker nodules 13 that drop into the clinker cooler 20, where they cool and are taken for pulverization. The air in the clinker cooler 20 cools the clinker 13 by absorbing heat therefrom and the air is thereby heated. This heated air is recycled into the rotary kiln 18 as "secondary air" to support the combustion therein and into the precalciner 16 via a tertiary air duct 21 as "tertiary air".

In the late 1950's and 1960's, prior to the development of the precalciner, the industry began experimenting with oxygen enrichment of kiln combustion as a potential refinement. Martin J. La Velle, in 1959, suggested such in "Oxygen Enrichment of Primary Air Can Improve Kiln Production," published in the journal *Rock Products*, but no practical application is known. Oxygen enrichment of secondary air has been practiced on several occasions. A report by Robert A. Gaydos, entitled "Oxygen Enrichment of Combustion Air in Rotary Kiln," published by the Portland Cement Association, indicated that oxygen enrichment could improve kiln production.

One common method of oxygen enrichment for a rotary kiln is to place an oxygen lance in between kiln burner 22 and the feed 12 in the rotary kiln 18. Oxygen is injected through the lance of the burner 22 at a certain tip velocity. Since the underside of the flame in contact with pure oxygen will exhibit high flame temperature, the oxygen lance is placed so that excessive flame temperature will not impact refractory and kiln coating. The drawbacks of this practice are many: (1) oxygen lance is subject to high temperature, (2) proper direction and velocity of oxygen jet is critical, (3) high flame temperature promotes increased NOx formation, and (4) high flame temperature may adversely impact refractory life.

The precalciner 16 also contains a firing point, which firing point can be equipped with multiple burners. The preheated feed 12 entering the precalciner 16 is suspended and calcined in the vessel thereof. The fuel injected at point 17 supplies the heat necessary to dissociate carbon dioxide from limestone in the feed 12. The combustion air is primarily supplied as tertiary air from the clinker cooler 20 through the tertiary air duct 21. Due to the large amount of limestone powder present, the feed 12 undergoes an endothermic reaction in the precalciner vessel and the combustion is flameless. Oxygen enrichment in the precalciner has a reduced risk to refractory life or to increased $NO_x$ formation, mainly due to the low temperature combustion.

However, a major deterrent to oxygen enrichment in cement kiln systems has always been the cost of oxygen. Some reports have also indicated technical concerns arising from s oxygen enrichment in the kiln, such as refractory life, burning zone shift and coating stability. Thus, despite the optimistic tenor of some experiment reports and even though it is commonly used in lime kilns, oxygen enrichment in cement kiln systems never became a common practice because of a variety of technological and economic considerations.

By contrast, so far as is known, nobody has attempted oxygen enrichment of combustion in the precalciner. One authority in the field, Kurt E. Peray in *The Rotary Kiln* (2nd ed. 1985), has suggested this specifically for precalciners without tertiary air ducts or for "air through" systems in order to reduce the excess air drawn through the kiln, but admits not knowing of any previous attempts and makes no mention of oxygen enrichment in systems using a tertiary air duct. Further, Peray admits that "[t]his idea would require research before deciding whether or not it could be feasibly implemented". Id., at p. 75. However, after approximately 12 years, nobody in the industry has reported such an experiment and certainly there are no known successful attempts.

Thus, it is desirable to develop a cement manufacturing process with higher productivity than is otherwise available from existing pyroprocessing equipment. It would also be desirable to avoid the disadvantages of traditional introduction of oxygen to the kiln burner.

SUMMARY OF THE INVENTION

The invention in its various embodiments includes a method and an apparatus for improving combustion in a cement kiln system. The method in one embodiment comprises enriching the tertiary air stream to the precalciner of a cement kiln system with oxygen. The apparatus in one embodiment comprises a precalciner and an oxygen source coupled to the precalciner.

BRIEF DESCRIPTION OF THE DRAWINGS

A more particular description of the invention briefly summarized above is set forth below by way of particular embodiments disclosed in the drawings of this specification and as described in connection therewith. The drawings nevertheless illustrate only typical, particular embodiments of the invention and are not to be considered limiting thereon as the invention may admit to other equally effective embodiments. In the drawings:

FIG. 3 details an oxygen supply apparatus generally illustrated in FIG. 2; and

FIGS. 4A–4C detail three alternative embodiments to interface a source of oxygen for the kiln in FIG. 2.

DESCRIPTION OF ILLUSTRATIVE EMBODIMENTS

Numerous specific details are set forth below in the detailed description of particular embodiments to provide a thorough understanding of the present invention. However, one of ordinary skill in the art having the benefit of this disclosure will understand that the present invention may be practiced without many of the details presented since such details will be necessary or useful depending on the particular embodiment being employed. Conversely, in other instances, well known details have not been described for the sake of clarity so as not to obscure the invention. It will be appreciated that supplying such details would be a routine undertaking for those of ordinary skill in the art, even if a complex and time-consuming task, given the benefit of this disclosure.

Figure 2:
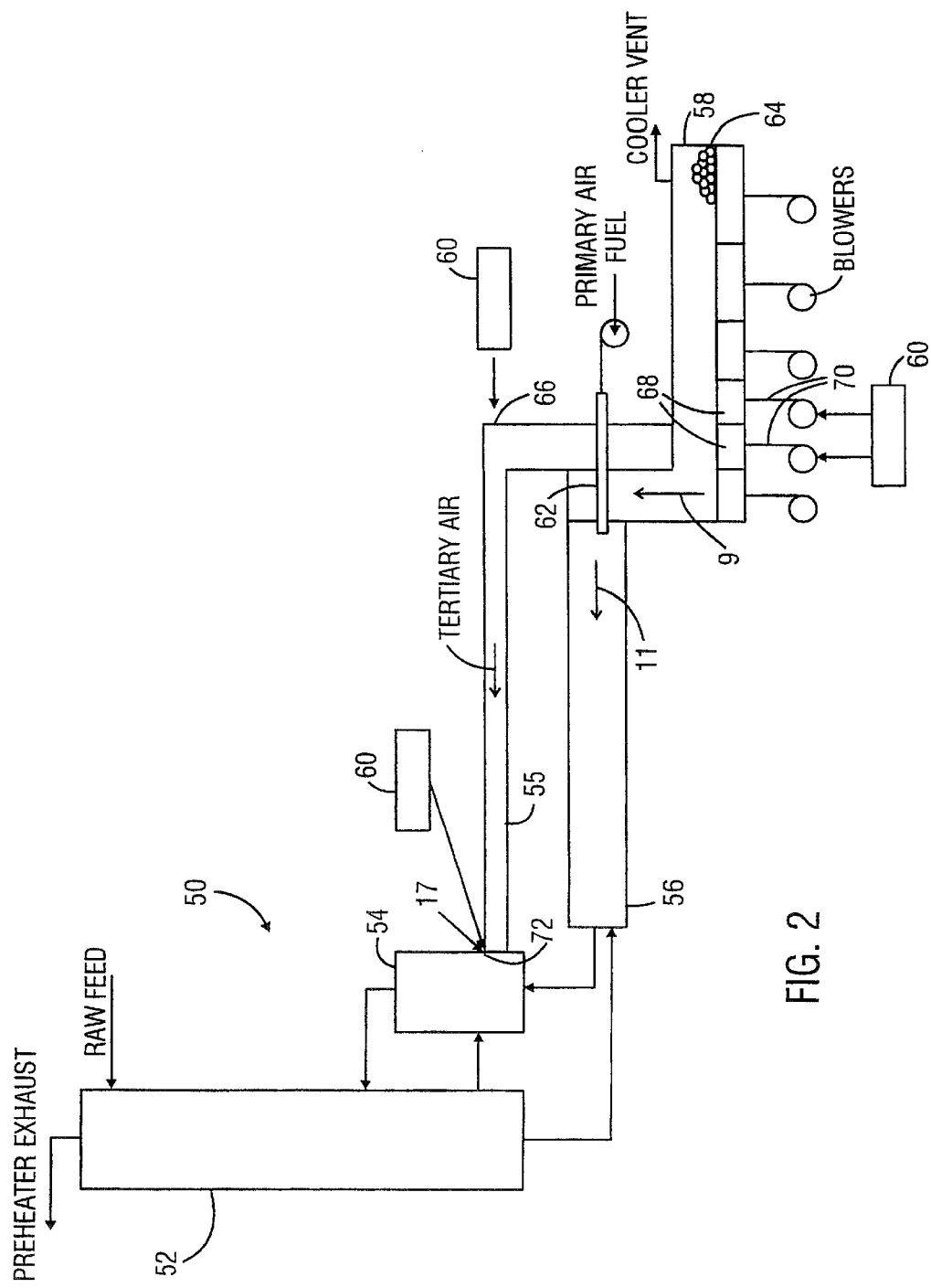
FIG. 2 schematically illustrates a cement manufacturing kiln system constructed in accordance with the invention, and illustrating several alternative embodiments for interfacing an oxygen source to the kiln.

FIG. 2 illustrates a cement manufacturing kiln system 50 constructed in accordance with one embodiment of the invention. The kiln system 50 generally comprises a cyclone preheater 52, a precalciner 54 equipped with a tertiary air duct 55 and coupled to the preheater 52, a rotary kiln 56 coupled to the precalciner 54, and a clinker cooler 58 coupled to the rotary kiln 56. The preheater 52 of the embodiment illustrated in FIG. 2 is a four-stage preheater, but other embodiments may employ, for instance, a single stage preheater. The precalciner 54 partially calcines the preheated feed material 12. As used herein, the term "precalcination" shall refer to that portion of the calcination process occurring prior to the feed material entering the rotary kiln 56 and the term "precalcined feed material" shall refer to the feed material partially calcined before it enters the rotary kiln 56. As is known in the art, the main burner 62 provides heat in the rotary kiln 56 to produce the clinker 64. The combustion air required to completely combust the fuel 17 comes in the form of primary air 11 and secondary air 9.

As shown in FIG. 2 and in accordance with the invention, oxygen enrichment of combustion in the precalciner can be accomplished in at least three locations. Oxygen can be introduced from oxygen source 60:

(a) at the tertiary air take-off 66 near the kiln burner platform (not shown), which is conveniently situated for operator supervision and where tertiary air duct 55 provides sufficient retention time for mixing;

(b) into the clinker cooler 58 at the second part of the recuperating zone 68 via proper air ducts 70 of the clinker cooler blowers, whereupon the oxygen from the source 60 may be preheated to improve the thermal efficiency; and (c) at a point 72 proximate the precalciner burner(s).

Oxygen source 60 provides gaseous oxygen from a cryogenic source, from a vacuum swing adsorption installation, or from any other oxygen production system as may be suitable depending on the quantity of usage, duration of usage and other economy considerations.

Figure 1:
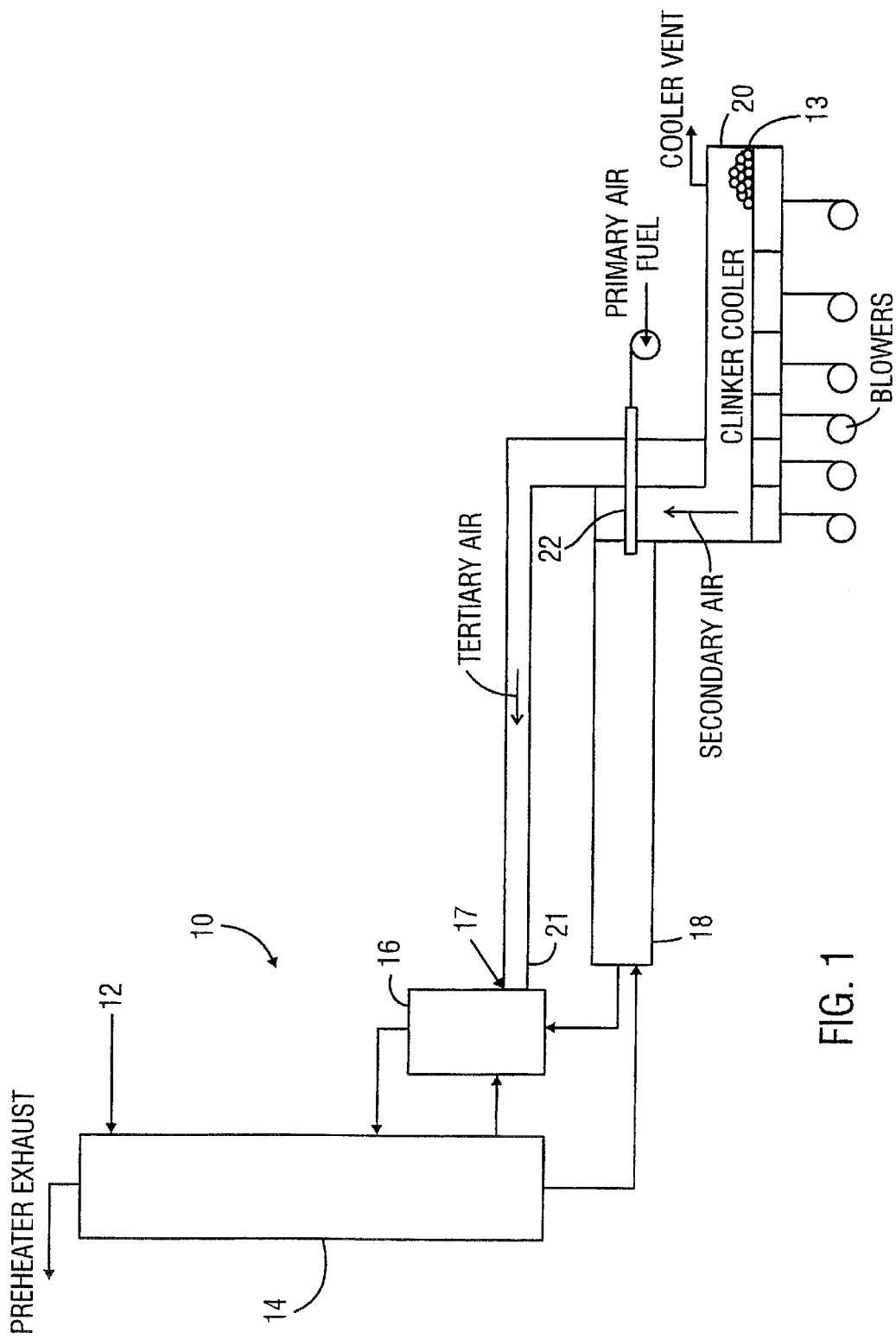
FIG. 1 schematically illustrates a conventional cement manufacturing kiln system having a precalciner such as is known in the prior art.

Note that oxygen source 60 provides a gas having an oxygen content greater than that of the ambient atmosphere. Thus, for example, clinker cooler 20 of the cement kiln system 10 of FIG. 1 is not an "oxygen source" as that term is used herein. However, sources providing a gas at 90% oxygen content or greater are preferred although concentrations even as low as 50% may be highly desirable in some embodiments.

FIG. 3 details the oxygen apparatus 74 by which oxygen source 60 interfaces with the kiln system 50. The oxygen supply apparatus 74 is a valve train comprising a block valve 76, a pressure regulator 78, a flow measuring device 80 with an indicator and a controller, a flow control valve 82, and a safety shut off valve 84, all as are known to those in the art. The same valve train comprising the embodiment of FIG. 3 may be used for each of the embodiments disclosed herein but the invention is not so limited. Other valve trains as may be suitable for this purpose may be employed instead.

FIG. 4A details the interface between oxygen source 60 and kiln system 50 in the embodiment wherein oxygen is introduced at the tertiary air take-off 66. Gaseous oxygen flows from oxygen source 60 through oxygen supply apparatus 74, to oxygen nozzle 86 through which it is introduced into tertiary air duct 55 and tertiary air take-off 66. The nozzle size of oxygen nozzle 86 is determined by the oxygen pressure and flow rate in a manner that will be apparent to those versed in the art having the benefit of this disclosure. In one particular embodiment, oxygen nozzle 86 is a lance such as is used for oxygen enrichment in a lime kiln.

FIG. 4B details the interface between oxygen source 60 and kiln system 50 in the embodiment wherein oxygen is introduced into the clinker cooler 58 at the second part of the recuperating zone 68 via proper air duct(s) 70 of the clinker cooler blowers (shown in FIG. 2). Oxygen nozzle 86 in this embodiment is connected to the discharge duct 70 of a cooler fan 88. As shown in FIG. 2, this embodiment may be deployed using multiple clinker cooler blowers. Due to a usually short duct run, the oxygen nozzle 86 can be perforated to facilitate mixing in this embodiment. A suitable cooler fan duct shall be selected for the oxygen injection so that the added oxygen is not wasted through the cooler vent (shown in FIG. 2) on one end and only a minimal amount of oxygen is directed into secondary air.

FIG. 4C details the interface between oxygen source 60 and kiln system 50 when oxygen is introduced at a point 72 proximate the precalciner burner 90. Because of the close proximity between the oxygen introduction and the precalciner, oxygen is introduced in this particular embodiment into a chamber 75 to mix with air therein before the introduction. There is no need for a chamber such as the chamber 75 in the embodiments of FIGS. 4A and 4B because the distance the oxygen and tertiary air must travel through the tertiary air duct 55 to reach the precalciner 54 provides ample opportunity for the oxygen and air to mix.

Returning now to FIG. 2, the operation of kiln system 50 is the same as for conventional kilns such as that illustrated in FIG. 1 with the exception for oxygen enrichment as noted immediately below. The commencement of oxygen enrichment begins once the pyrosystem stabilizes under normal operations. The oxygen introduction may be broken into several parts. At each part of the process, the fuel to the precalciner 54 is adjusted to maintain a desired excess oxygen level in the precalciner 54. Kiln feed can be added to maintain proper temperature in a manner well known to the art. Limitations of the system should be closely observed, such as cooler vent capacity, kiln feed capacity, fuel limitation, clinker temperature and other temperature limitations. In one particular embodiment employing a single stage precalciner kiln, yields of 3.5 tons of clinker per ton of oxygen was obtained using oxygen rates as high as 25% of stochiometric requirement to combust the fuel in the precalciner 54.

Oxygen enrichment in accord with the invention as set forth above increases heat input for a given combustion gas flow, though in some configurations oxygen at ambient temperatures is substituted for preheated tertiary air. Thus, it can be seen that the present invention possesses numerous desirable characteristics. First, precalciner combustion is low temperature and flameless so that risk of damage to refractories is reduced and increases in thermal $NO_x$ are avoided and do not artificially limit the addition rate of the oxygen. Second, injection is simple. Adding oxygen to a tertiary duct close to the clinker cooler take-off ensures adequate mixing before entering the precalciner vessel. (In contrast, oxygen enrichment of the main kiln burner requires optimal lance position and injection velocity to assure satisfactory flame conditions.) Third, the oxygen enrichment can be used selectively on an as-needed basis to increase production capacity. Lastly, oxygen enrichment as disclosed above is typically a cost effective alternative to conventional high capital cost equipment modifications and can be implemented faster than equipment modifications.

The particular embodiments disclosed above are illustrative only as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. An apparatus for improving the production of cement clinker in a cement kiln system, the apparatus comprising:
   a precalciner equipped with at least one burner;
   a tertiary air source; and
   an oxygen source coupled to the precalciner.

2. The apparatus of claim 1, wherein the oxygen source is coupled to at least one of the precalciner and the tertiary air source by a valve train.

3. The apparatus of claim 1, wherein the oxygen source is coupled to the precalciner at a point proximate the precalciner's burner.

4. The apparatus of claim 3, wherein the oxygen source is coupled by a valve train.

5. The apparatus of claim 1, wherein the oxygen source is coupled to the precalciner by a duct through which oxygen enriched air may pass.

6. The apparatus of claim 5, wherein the oxygen source is further coupled to the precalciner by a valve train.

7. The apparatus of claim 1, wherein the oxygen source is at least one of a source of cryogenic oxygen and a vacuum swing adsorption installation.

8. The apparatus of claim 1, further comprising an air source coupled to the precalciner and to the oxygen source.

9. The apparatus of claim 8, wherein the oxygen source is at least one of a source of cryogenic oxygen and a vacuum swing adsorption installation.

10. The apparatus of claim 8, wherein the air source is a clinker cooler.

11. The apparatus of claim 8, further comprising means for mixing air from the air source and oxygen from the oxygen source.

12. The apparatus of claim 8, wherein the air source is coupled to the oxygen source and the precalciner by a duct through which oxygen enriched air may pass.

13. An apparatus for improving the production of cement clinker in a cement kiln system, the apparatus comprising:
    a precalciner equipped with at least one burner; and
    means for introducing oxygen into a tertiary air stream coupled to the precalciner.

14. The apparatus of claim 13, wherein the introducing means includes an oxygen source coupled to the precalciner.

15. The apparatus of claim 13, wherein the introducing means is coupled to the precalciner by a duct through which oxygen enriched air may pass.

16. The apparatus of claim 13, wherein the introducing means includes at least one of a source of cryogenic oxygen and a vacuum swing adsorption installation.

17. The apparatus of claim 13, further comprising an air source coupled to the precalciner and to the introducing means.

18. The apparatus of claim 17, wherein the introducing means includes at least one of a source of cryogenic oxygen and a vacuum swing adsorption installation.

19. The apparatus of claim 17, wherein the air source is a clinker cooler.

20. The apparatus of claim 17, further comprising means for mixing air from the air source and oxygen from the introducing means.

21. An apparatus for manufacturing cement, the apparatus comprising:
    a preheater;
    a precalciner coupled to the preheater, said precalciner being equipped with at least one burner;
    an oxygen source coupled to the precalciner;
    a rotary kiln coupled to the precalciner;
    a clinker cooler coupled to the rotary kiln and to the precalciner.

22. The apparatus of claim 21, wherein the oxygen source is coupled by a valve train.

23. The apparatus of claim 21, wherein the oxygen source is coupled to the precalciner at a point proximate the precalciner's burner.

24. The apparatus of claim 23, wherein the oxygen source is coupled by valve train.

25. The apparatus of claim 21, wherein the oxygen source is coupled to the precalciner by a duct through which oxygen enriched air may pass.

26. The apparatus of claim 25, wherein the oxygen source is further coupled to the precalciner by a valve train.

27. The apparatus of claim 21, wherein the oxygen source is at least one of a source of cryogenic oxygen and a vacuum swing adsorption installation.

28. The apparatus of claim 21, further comprising an air source coupled to the precalciner and to the oxygen source.

29. The apparatus of claim 28, wherein the oxygen source is at least one of a source of cryogenic oxygen and a vacuum swing adsorption installation.

30. The apparatus of claim 28, wherein the air source is a clinker cooler.

31. The apparatus of claim 28, further comprising means for mixing air from the air source and oxygen from the oxygen source.

32. The apparatus of claim 28, wherein the air source is coupled to the oxygen source and the precalciner by a duct through which oxygen enriched air may pass.

33. An apparatus for manufacturing cement, the apparatus comprising:

a preheater;

a precalciner coupled to the preheater, said precalciner being equipped with at least one burner;

an oxygen source including at least one of a source of cryogenic oxygen and a vacuum swing adsorption installation;

a rotary kiln coupled to the precalciner;

an air source including a clinker cooler coupled to the precalciner and to the rotary kiln; and a duct coupling the oxygen source to the precalciner and the air source to the precalciner and to the rotary kiln.

34. An apparatus for manufacturing cement, the apparatus comprising:

a preheater;

a precalciner coupled to the preheater, said precalciner being equipped with at least one burner;

an oxygen source coupled to the precalciner, the oxygen source including at least one of a source of cryogenic oxygen and a vacuum swing adsorption installation;

a rotary kiln coupled to the precalciner; and an air source including a clinker cooler coupled to the precalciner and to the rotary kiln.

35. A process of operating a kiln, comprising the steps of:

providing a kiln including
- a kiln chamber, an inlet and a clinker outlet,
- a burner positioned so that its flame is directed into said kiln chamber, said burner including a fuel inlet, an oxidant inlet, and an outlet,
- a clinker cooler positioned to receive clinkers from said clinker outlet and including at least one air inlet into said clinker cooler, and
- an oxidant source in fluid communication with said at least one clinker cooler air inlet;
- wherein said oxidant source comprises a non-pure-air oxidant selected from the group consisting of pure oxygen and oxygen-enriched air;

flowing oxidant from said oxidant source through said at least one clinker cooler air inlet; and flowing material to be calcined into said kiln chamber to form clinkers.

36. A process of operating a kiln in accordance with claim 35, wherein said providing step further comprises the step of providing a kiln including a precalciner including a raw material inlet, a precalcined material outlet, and an air inlet, wherein said precalciner precalcined material outlet leads to said kiln chamber inlet, wherein said precalciner air inlet is in fluid communication with and downstream of said clinker cooler, and wherein said flowing step further comprises flowing oxidant to said clinker cooler air inlet to form oxidant-enriched air in said clinker cooler, said precalciner producing precalcined material which then becomes material to be calcined.

37. A process of operating a kiln in accordance with claim 36, wherein said flowing step further comprises the step of flowing oxidant-enriched air from said clinker cooler to said precalciner air inlet.

38. An kiln useful in producing clinkers, comprising:

a kiln chamber having an inlet and a clinker outlet;

a burner positioned so that its flame is directed into said kiln chamber, said burner including a fuel inlet, an oxidant inlet, and an outlet;

a clinker cooler positioned to receive clinkers from said clinker outlet and including at least one air inlet into said clinker cooler; and an oxidant source in fluid communication with said at least one clinker cooler air inlet;

wherein said oxidant source comprises a non-pure-air oxidant selected from the group consisting of pure oxygen and oxygen-enriched air.

39. An kiln in accordance with claim 38, further comprising a precalciner including a raw material inlet, a precalcined material outlet, and an air inlet, wherein said precalcined material outlet leads to said kiln chamber inlet, and wherein said precalciner air inlet is in fluid communication with and downstream of said clinker cooler.

* * * * *